United States Patent
Auge et al.

(10) Patent No.: US 9,953,215 B2
(45) Date of Patent: Apr. 24, 2018

(54) METHOD AND SYSTEM OF TEMPORAL SEGMENTATION FOR MOVEMENT ANALYSIS

(71) Applicant: Konica Minolta Laboratory U.S.A., Inc., San Mateo, CA (US)

(72) Inventors: Quentin Auge, San Mateo, CA (US); Yongmian Zhang, Union City, CA (US); Haisong Gu, Cupertino, CA (US)

(73) Assignee: KONICA MINOLTA LABORATORY U.S.A., INC., San Mateo, CA (US)

( * ) Notice: Subject to any disclaimer, the term of this patent is extended or adjusted under 35 U.S.C. 154(b) by 0 days.

(21) Appl. No.: 15/507,735

(22) PCT Filed: Aug. 27, 2015

(86) PCT No.: PCT/US2015/047095
§ 371 (c)(1),
(2) Date: Feb. 28, 2017

(87) PCT Pub. No.: WO2016/033279
PCT Pub. Date: Mar. 3, 2016

(65) Prior Publication Data
US 2017/0286760 A1    Oct. 5, 2017

Related U.S. Application Data

(63) Continuation of application No. 14/473,679, filed on Aug. 29, 2014, now abandoned.

(51) Int. Cl.
*G06K 9/00* (2006.01)

(52) U.S. Cl.
CPC ..... *G06K 9/00342* (2013.01); *G06K 9/00201* (2013.01); *G06K 9/00765* (2013.01)

(58) Field of Classification Search
CPC combination set(s) only.
See application file for complete search history.

(56) References Cited

U.S. PATENT DOCUMENTS

| | | |
|---|---|---|
| 6,256,400 B1 | 7/2001 | Takata et al. |
| 2010/0002908 A1 | 1/2010 | Miyamoto et al. |

(Continued)

OTHER PUBLICATIONS

International Search Report (PCT/ISA/210) dated Nov. 27, 2015, by the Japanese Patent Office as the International Searching Authority for International Application No. PCT/US2015/047095.

(Continued)

*Primary Examiner* — Alex Liew
(74) *Attorney, Agent, or Firm* — Buchanan Ingersoll & Rooney PC

(57) ABSTRACT

A method, system and non-transitory computer readable medium are disclosed for recognizing gestures, the method includes capturing at least one three-dimensional (3D) video stream of data on a subject; extracting a time-series of skeletal data from the at least one 3D video stream of data; isolating a plurality of points of abrupt content change called temporal cuts, the plurality of temporal cuts defining a set of non-overlapping adjacent segments partitioning the time-series of skeletal data; identifying among the plurality of temporal cuts, temporal cuts of the time-series of skeletal data having a positive acceleration; and classifying each of the one or more pair of consecutive cuts with the positive acceleration as a gesture boundary.

20 Claims, 4 Drawing Sheets

(56) References Cited

U.S. PATENT DOCUMENTS

| | | | |
|---|---|---|---|
| 2010/0290538 A1* | 11/2010 | Xu | G06T 13/205 375/240.28 |
| 2011/0289455 A1 | 11/2011 | Reville et al. | |
| 2011/0292036 A1 | 12/2011 | Sali et al. | |
| 2012/0143358 A1 | 6/2012 | Adams et al. | |
| 2013/0034265 A1 | 2/2013 | Nakasu et al. | |
| 2013/0294651 A1 | 11/2013 | Zhou et al. | |
| 2014/0067107 A1 | 3/2014 | Stanhope et al. | |
| 2014/0270351 A1 | 9/2014 | Hoof et al. | |

OTHER PUBLICATIONS

Written Opinion (PCT/ISA/237) dated Nov. 2, 2015, by the Japanese Patent Office as the International Searching Authority for International Application No. PCT/US2015/047095.

Bailador et al., "Real time gesture recognition using Continuous Time Recurrent Neural Networks," Proceedings of the ICST (Institute for Computer Sciences, SocialInformatics and Telecommunications Engineering) 2nd International Conference on Body Area Networks, Jun. 11-13, 2007. (8 pages).

Bernier et al., "Human gesture segmentation based on change point model for efficient gesture interface," IEEE RO-MAN 2013: The 22nd IEEE International Symposium on Robot and Human Interactive Communication, Aug. 26-29, 2013, pp. 258-263. (6 pages).

Blunsom, "Hidden Markov Models," Lecture Notes, August, 15:18-19, 2004. (7 pages).

Desobry et al., "An Online Kernel Change Detection Algorithm," IEEE Transactions on Signal Processing, vol. 53, vol. 8, Aug. 2005, pp. 2961-2974. (14 pages).

Gong et al., "Kernelized Temporal Cut for Online Temporal Segmentation and Recognition," Computer Vision—ECCV 2012, pp. 229-243. (14 pages).

Gretton et al., "A Kernel Two-Sample Test," The Journal of Machine Learning Research, vol. 13, No. 1, pp. 723-773. (51 pages).

Harchaoui et al., "Kernel Change-point Analysis," Advances in Neural Information Processing Systems, 2009, pp. 609-616. (8 pages).

Hoai et al., "Maximum Margin Temporal Clustering," Proceedings of the 15th International Conference on Artificial Intelligence and Statistics, 2012. (9 pages).

Kahol et al., "Automated Gesture Segmentation From Dance Sequences," Proceedings of the Sixth IEEE International Conference on Automatic Face and Gesture Recognition, 2004, pp. 883-888. (6 pages).

Kahol et al., "Gesture Segmentation in Complex Motion Sequences," Proceedings 2003 International Conference on Image Processing, 2003, pp. II-105-II-108. (4 pages).

Lee et al., "An HMM-Based Threshold Model Approach for Gesture Recognition," IEEE Transactions on Pattern Analysis and Machine Intelligence, vol. 21, No. 10, Oct. 1999, pp. 961-973. (13 pages).

Rabiner et al., "An Introduction to Hidden Markov Models," IEEE ASSP Magazine, vol. 3, No. 1, Jan. 1986, pp. 4-16. (12 pages).

Starner et al., "Visual Recognition of American Sign Language Using Hidden Markov Models," Technical report, DTIC Document, 1995. (6 pages).

Strathmann, "M.Sc. Machine Learning: Adaptive Large-Scale Kernel Two-Sample Testing," University College London Centre for Computational Statistics and Machine Learning, Sep. 2012, pp. i-118. (124 pages).

Suk et al., "Recognizing Hand Gestures using Dynamic Bayesian Network," IEEE, 2008. (6 pages).

Suk et al., "Hand gesture recognition based on dynamic Bayesian network framework," Pattern Recognition, 2010, vol. 43, pp. 3059-3072. (14 pages).

Taylor, "Change-Point Analysis: A Powerful New Tool for Detecting Changes," 2000. (19 pages).

Turaga, "Unsupervised View and Rate Invariant clustering of Video Sequences," Computer Vision and Image Understanding, 2009, vol. 113, No. 3. (43 pages).

Wang, "Hidden Conditional Random Fields for Gesture Recognition," 2006 IEEE Computer Society Conference on Computer Vision and Pattern Recognition, vol. 2. (7 pages).

Xu et al., "Maximum Margin Clustering," Neural Information Processing Systems, 2004. (8 pages).

Zhou et al., "Aligned Cluster Analysis for Temporal Segmentation of Human Motion," 2008 FG'08, 8th IEEE International Conference on Automatic Face & Gesture Recognition, 2008. (8 pages).

\* cited by examiner

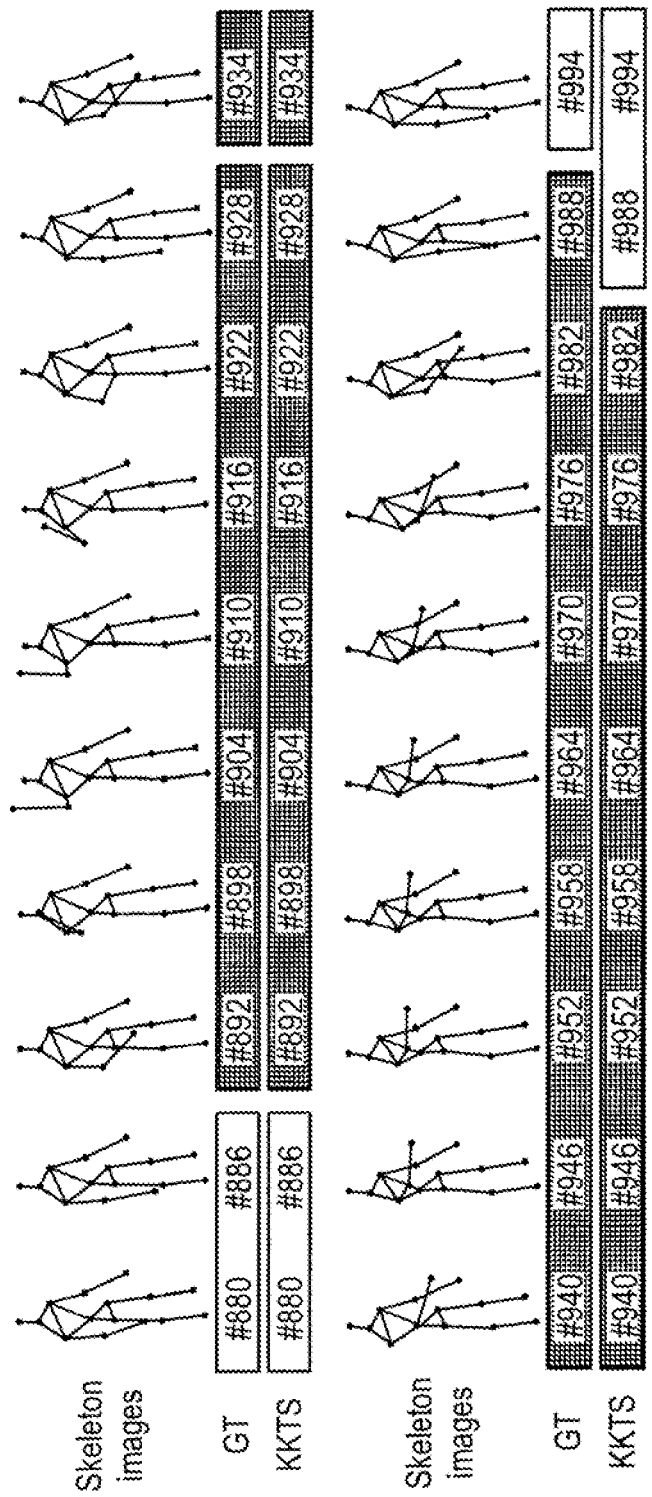

METHOD AND SYSTEM OF TEMPORAL SEGMENTATION FOR MOVEMENT ANALYSIS

CROSS-REFERENCE TO RELATED APPLICATIONS

This application claims the benefit of U.S. patent application Ser. No. 14/473,679, filed Aug. 29, 2014, the entire contents of which is hereby incorporated herein by reference.

FIELD

The present disclosure relates to a method and system of temporal segmentation for gesture analysis, and more particularly, to a method and system for identifying gesture boundaries within a flow of human motion, which can be used as input or preprocessing module for gesture analysis, such as gesture classification and recognition.

BACKGROUND

Gesture recognition is an example of an application using an efficient temporal segmentation, or the task of finding gestures within a flow of human motion, as a pre-processing step. Usually performed in an unsupervised manner, the step of temporal segmentation facilitates subsequent recognition of gestures.

Gesture recognition and segmentation can be performed either in a simultaneous or sequential fashion. For examples machine learning frameworks capable of modeling time aspects directly, such as hidden Markov models (HMMs), continuous-time recurrent neural networks (CTRNNs), dynamic Bayesian network (DBNs) or conditional random, fields (CRFs) can be used for simultaneous gesture recognition and segmentation. Temporal segmentation has also been studied independently of its recognition counterpart. Nevertheless, when it occurs, two main approaches predominate, namely temporal clustering and change-point detection.

Temporal clustering (TC) refers to the factorization of multiple time series into a set on non-overlapping segments that belongs to k temporal clusters. Being inherently offline, the approach benefits from a global point of view on the data and provides cluster labels as in clustering. However, temporal clustering may not be suitable for real-time applications.

Change-point methods rely on various tools from signal theory and statistics to locate frames of abrupt change in pattern within the flow of motion. Although change-point methods can be restricted to, univariate series with parametric distribution assumption (which does not hold when analyzing human motion), the recent use of kernel methods released part of these limitations, change-point methods have been recently applied to the temporal segmentation problem. Unlike temporal clustering, the change-point approach often results in unsupervised online algorithms, which can perform real-time, relying on local patterns in time-series.

Although significant progress has been made in temporal segmentation, the problem still remains inherently challenging due to viewpoint changes, partial occlusions, and spatio-temporal variations.

SUMMARY

In accordance with an exemplary embodiment, a method is disclosed for recognizing gestures, comprising: capturing at least one three-dimensional (3D) video stream of data on a subject; extracting a time-series of skeletal data from the at least one 3D video stream of data; isolating a plurality of points of abrupt content change and identifying each of the plurality of points of abrupt content change as a temporal cut, and wherein a plurality of temporal cuts define a set of non-overlapping adjacent segments partitioning the time-series of skeletal data; identifying among the plurality of temporal cuts, temporal cuts of the time-series of skeletal data having a positive acceleration; and classifying each of the one or more pair of consecutive cuts with the positive acceleration as a gesture boundary.

In accordance with an exemplary embodiment, a system is disclosed for recognizing gestures, comprising: a video camera for capturing at least one three-dimensional (3D) video stream of data on a subject; a module for extracting a time-series of skeletal data from the at least one 3D video stream of data; and a processor configured to: isolate a plurality of points of abrupt content change and identifying each of the plurality of points of abrupt content change as a temporal cut, and wherein a plurality of temporal cuts define a set of non-overlapping adjacent segments partitioning the time-series of skeletal data; identifying among the plurality of temporal cuts, temporal cuts of the time-series of skeletal data having a positive acceleration; and classifying each of the one or more pair of consecutive cuts with the positive acceleration as a gesture boundary.

In accordance with an exemplary embodiment, a non-transitory computer readable medium containing a computer program storing computer readable code is disclosed for recognizing gestures, the program being executable by a computer to cause the computer to perform a process comprising: capturing at least one three-dimensional (3D) video stream of data on a subject; extracting a time-series of skeletal data from the at least one 3D video stream of data; isolating a plurality of points of abrupt content change and identifying each of the plurality, of points of abrupt content change as a temporal cut, and wherein a plurality of temporal cuts define a set of non-overlapping adjacent segments partitioning the time-series of skeletal data; identifying among the plurality of temporal cuts, temporal cuts of the time-series of skeletal data having a positive acceleration; and classifying each of the one or more pair of consecutive cuts with the positive acceleration as a gesture boundary.

It is to be understood that both the foregoing general description and the following detailed description are exemplary and explanatory and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 5 is an illustration of a segmentation in accordance with an exemplary embodiment.

DESCRIPTION OF THE PREFERRED EMBODIMENTS

It can be appreciated that when, attempting to perform temporal segmentation of gestures, that is the task of finding gestures within a flow of human motion, numerous ambiguities can arise. For example, while some gestures can be performed subsequently without a pause in between (such gestures are called continuous gestures), some gestures include a pause right in the middle of the gesture, which can make it relatively impossible to trigger gesture boundaries by simply observing abrupt changes from immobility to motion, or from motion to immobility.

Among change-paints methods, Kernelized Temporal Cut (KTC) algorithm models the temporal segmentation problem as a series of two-sample problems within varying-size sliding windows, and solves it by using a test statistic based on Maximum Mean Discrepancy (MMD). In accordance with an exemplary embodiment, a method and system of temporal segmentation for gesture analysis is disclosed, which is referred herein as "Kinematic Kernelized Temporal Segmentation" (KKTS).

It can be appreciated that temporal segmentation, or the task of finding gestures within of a flow of human motion, can be crucial in many computer vision applications. For example, RGB-D sensors (or cameras), and their associated frameworks can provide for relatively easy and reliable extraction of a skeletal model from human users, and which can provide opportunities for the development of gesture recognition applications. However, temporal segmentation of gestures is still an open and challenging problem because it can be difficult to define a "gesture". Accordingly, it would be desirable to have a method and system for detecting gesture boundaries in an unsupervised and online manner while maintaining a decent tradeoff between over-segmentation and under-segmentation.

In accordance with an exemplary embodiment, a method and system of temporal segmentation for gesture analysis is disclosed, which is referred herein as a "Kinematic Kernelized Temporal Segmentation" (KKTS). For example, in accordance with an exemplary embodiment, while performing in real-time and in an unsupervised manner, the KKTS module (or algorithm) as disclosed herein, can locate gestures boundaries from a video-stream or flow of skeletal information. In addition, the KKTS module (or algorithm) can be used independent of any subsequent classification step or algorithm, which can make the system and method as disclosed herein, an ideal application for inclusion into a gesture processing system, including gesture recognition systems.

Figure 1:
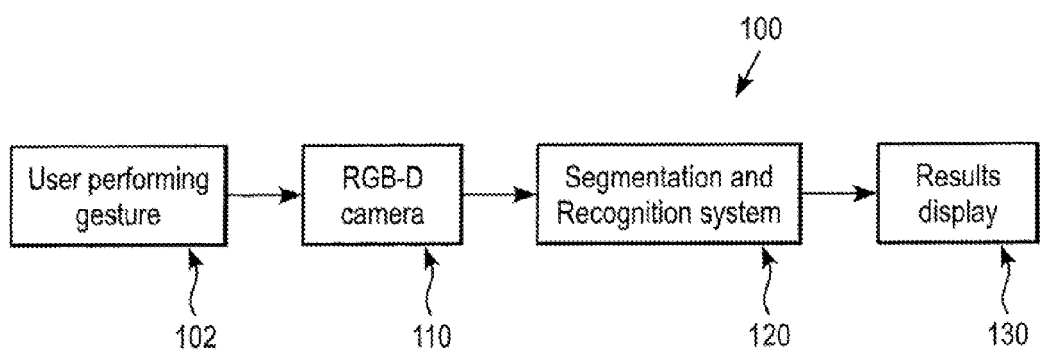
FIG. 1 is an illustration of a gesture recognition system in accordance with an exemplary embodiment.

FIG. 1 is an illustration of a gesture recognition system 100 in accordance with an exemplary embodiment. As shown in FIG. 1, the system 100 can include a RGB-D camera 110 having, for example, Red, Green, Blue color space with a depth or distance capability, which can be used for acquiring color images (RGB color space) and a depth or distance of a subject or user 102 in each of the images. In accordance with an exemplary embodiment, the subject or user 102 can be performing one or more gestures.

In accordance with an exemplary embodiment, the system also preferably includes a segmentation and recognition system 120 and a display 130 having a graphical user interface (GUI) configured to display the results from the segmentation and recognition system 120. In accordance with an, exemplary embodiment, the segmentation and recognition system 120 and/or the display 130 can include a computer or processing device having a memory, a processor, an operating system, one or more software applications for executing an algorithm as disclosed, and a display or graphical user interface (GUI) 130. It can be appreciated that the segmentation and recognition system 120 and/or the GUI or display 130 can be part of a standalone computer, or can be contained within one or more computer or processing devices.

Figure 2:
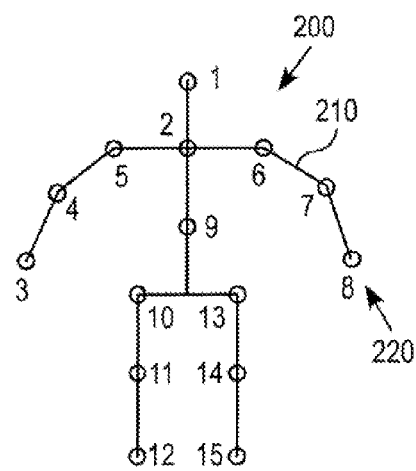
FIG. 2 is an illustration of a human skeleton system showing the body joints.

FIG. 2 illustrates skeleton representation 200 for an exemplary user facing the RGB-D camera 120 wherein the skeleton 200 consists of 15 joints and 11 line segments representing head, shoulders and limbs of human body. As shown in FIG. 2, the line segments 210 are mutually connected by joints 220 and the movement of one segment is constrained by other. Furthermore, a few of the parts or line segments 210 can perform the independent motion while the others may stay relatively stationary, for example, such as a head movement.

In accordance with an exemplary embodiment, the position of a line segment 210 in 3D space can be determined by the two joints 220. For example, for a 3D skeleton frame, 15 body skeleton joints data can be extracted, which can be used to simulate the movement of human body.

Figure 3:
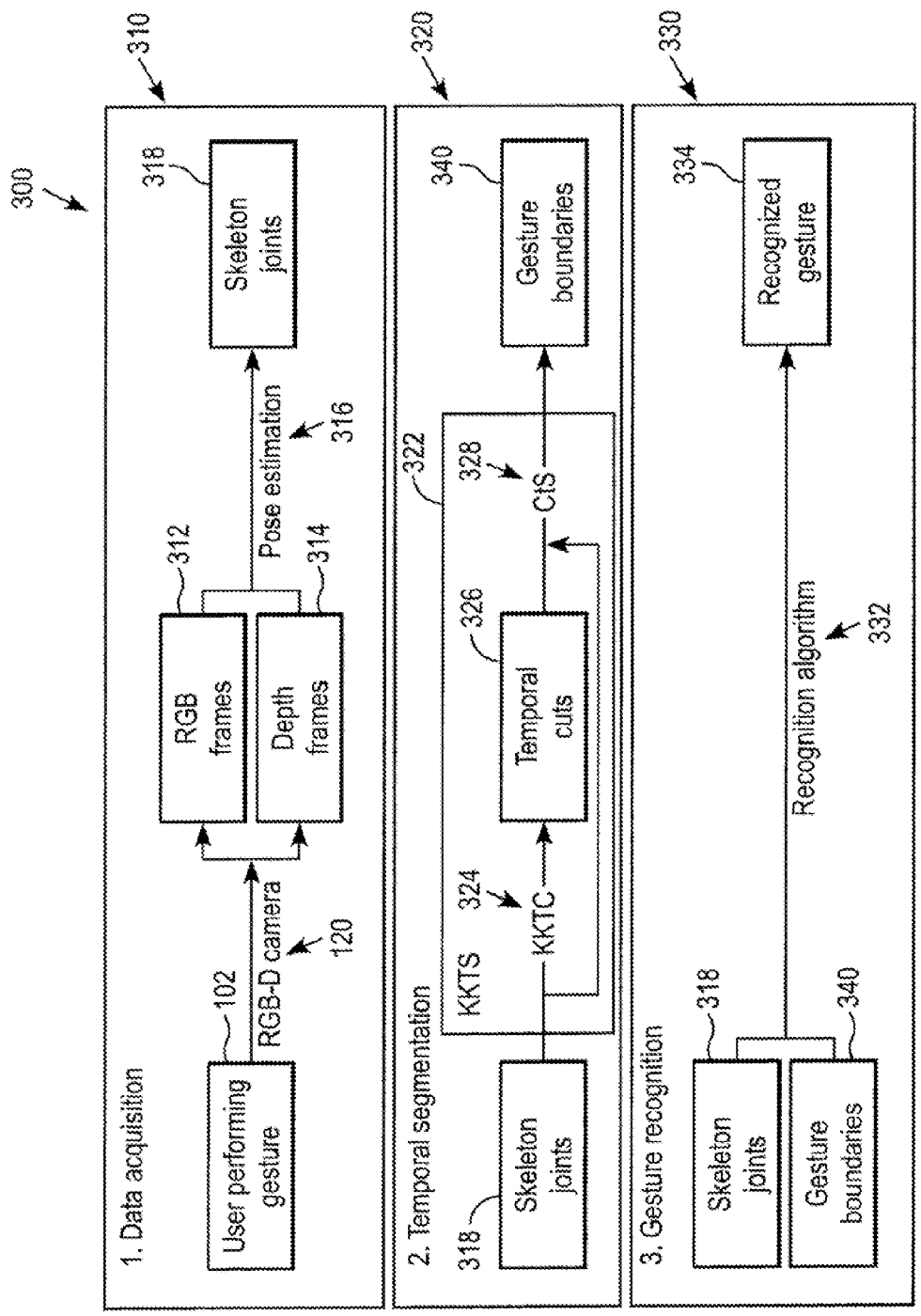
FIG. 3 is an illustration of a gesture recognition system in accordance with an exemplary embodiment.
Figure 4:
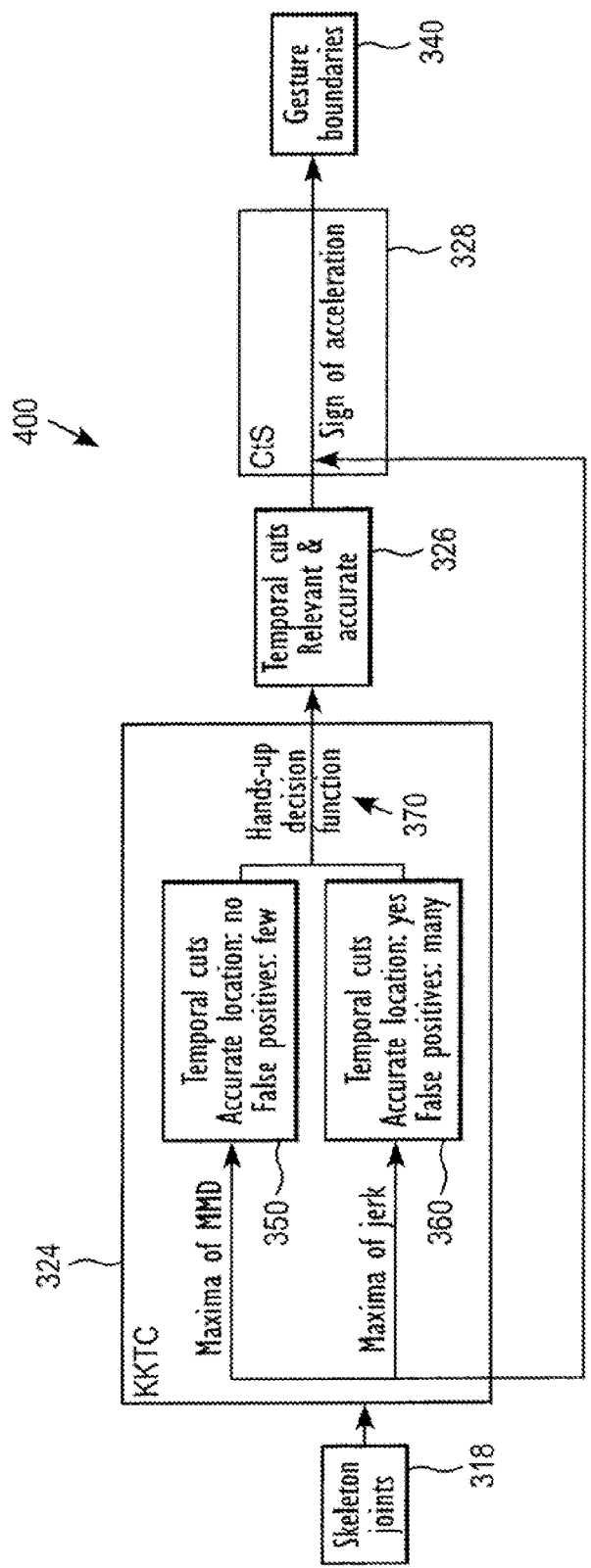
FIG. 4 is an illustration of a flowchart illustrating a method of temporal segmentation for gesture analysis in accordance with an exemplary embodiment.

FIG. 3 is an illustration of a gesture recognition system 300 in accordance with an exemplary embodiment. As shown in FIG. 3, the gesture recognition system 300 includes a data acquisition module 310, a temporal segmentation module 320, and a gesture recognition module 330.

In accordance with an exemplary embodiment, the data acquisition module 310 captures at least one three-dimensional (3D) video stream of data 312 on a subject performing one or more gestures. The 3D video stream of data can be obtained from, for example, a RGB-D camera 120, which is configured to capture RGB frames 312 and depth frames 314. In accordance with an exemplary embodiment, a time-series of skeletal data 318 is extracted from the at least one 3D video stream of data based on a pose estimation 316 as disclosed herein. The time-series of skeletal data 318 can include, for example, a plurality of skeleton joints 220.

In accordance with an exemplary embodiment, the time-series of skeletal data 318 is input into the temporal segmentation module 320, which includes a KKTS module 322 having a KKTC module 324, which is configured to generate at least two temporal cuts 326. In accordance with an exemplary embodiment, the at least two temporal cuts 326 define non-overlapping adjacent segments partitioning the time-series of skeletal data 318. The temporal cuts 326 can then be input into the Cuts to Segment (CtS) module 328 of the KKTS module 322 to identifying segments containing gestures based on acceleration at each of the temporal cut 326. For example, if the rate of acceleration is positive at a temporal cut, the segment between the temporal cut and the consecutive temporal cut containing a gesture, for example, boundaries of a gesture boundary 340 can be recognized.

In accordance with an exemplary embodiment, the gesture recognition module 330 can receive the time-series of skeletal data 318 and the gesture boundaries 340, which can be input into a recognition algorithm or classification system 332 for determination of a recognized gesture 334.

FIG. 5 is an illustration of a flowchart 400 illustrating an exemplary method and system of temporal segmentation for gesture analysis, which can include a Kinematic Kernelized Temporal Cuts (KKTC) module 324, an optional hands-up decision function module 370, and Cuts to Segments (CtS) module 328.

In accordance with an exemplary embodiment, the input of skeleton joints 220 into the KKTS module 322 can be split into two method or algorithms, for example, a Kinematic Kernelized Temporal Cuts (KKTC) module 324 and a Cut to Segments (CtS) module 328. In accordance with an exemplary embodiment, the KKTC module 324 receives a me-series of skeletal data 318 of a user 102 performing gestures in front of the camera 120, and returns temporal cuts 326 disclosed herein, which define non-overlapping adjacent segments partitioning the time-series of skeletal data 318. In accordance with an exemplary embodiment, the cuts to Segments (CtS) module 328 finds and returns, among all segments defined by temporal cuts, boundaries of segments containing gestures 340.

In accordance with an exemplary embodiment, a time-series of skeletal information or data 318 of size T, can be defined as $X \in R^{3N \times T}$. In accordance with an exemplary embodiment, each element of X is a vector of N 3-dimensional skeleton joints 220, which are input into the KKTS module 324.

In accordance with an exemplary embodiment, the KKTS module 324 scans the sequences using two consecutive sliding windows of the same fixed size 350, 360. For example, the two consecutive sliding windows can be defined with $T_0 \in N$, and $\delta T \in N$, which can be two parameters respectively called size of sliding windows and step length of moving to sliding windows. For every t such that $t-T_0 \geq 1$ and $t+T_0-1 \leq T$, let $W_1^t=[t-T_0;t-1]$ and $W_2^t=[t;t+T_0-1]$, respectively the left and right sliding window at frame t.

In accordance with an exemplary embodiment, the two sliding windows can be used to compute an estimate of Maximum Mean Discrepancy (MMD) 350 within X. For example, the MMD 350 can be used to quantify global motion of body, and can be defined as follows:

$$MMD(t) = \frac{1}{T_0}\left[\sum_{i \in W_1^2}\sum_{j \in W_1^2} k(x_i, x_j) + \sum_{i \in W_1^2}\sum_{j \in W_1^2} k(x_i, x_j) - 2\sum_{i \in W_1^2}\sum_{j \in W_1^2} k(x_i, w_j)\right]$$

where k is Gaussian kernel of bandwidth $$\sigma = \sqrt{\frac{1}{2\gamma}},$$

which can be defined as:

$$k(x,y)=\exp(-\gamma\|x-y\|^2)$$

which quantity or result, can be used in the KKTC module 324 to find rough location of temporal cuts 326.

In accordance with an exemplary embodiment, the KKTS module 322 can use the following kernelized kinematic quantities, defined with the same Gaussian kernel k as used in MMD:

Global kernelized velocity of body at time t:

$$v(t) = 1 - \frac{1}{2T_v+1}\sum_{i=-T_v}^{T_v} k(x_i, x_{j+1})$$

although the calculated velocity is not used directly in the algorithm, it is used to describe the next two quantities. $T_v=2$ can be a good value.

Global kernelized acceleration of body at time t:

$$a(t)=v(t+T_a)-v(t-T_a)$$

Physically, it designates the rate of change of velocity with respect to time. $T_a=1$ can be a good value. In accordance with an exemplary embodiment, it can be used by the CtS module 328 to find out which segments contain gestures.

Global kernelized jerk of body at time t:

$$j(t)=v(t-T_j)-2v(t)+v(t+T_j)$$

Physically, the global kernelized jerk of body designates the rate of change of acceleration with respect to time. $T_j=4$ can be a good value. In accordance with an exemplary embodiment, the rate of change of acceleration (or the global kernelized jerk of body) can be used in the KKTC module 324 to find or locate a relatively precise location of the temporal cuts 326.

In accordance with an exemplary embodiment, an optional "hands-up" decision function (or module) 370 can also be used to assist with the identification of the temporal cuts 326 based on the assumption that a user is more likely to be in the middle of a gesture if the subject or users hands are up than they are down. For example, the following function, hereinafter called "hands-up" decision function denoted D can be defined as the sum of the vertical position of left-hand denoted $L_y$, and vertical position of right-hand denoted $R_y$, at time t, retrieved from X. The hands-up decision 370 can be expressed as follows:

$$D(t)=L_y(t)+R_y(t)$$

In accordance with an exemplary embodiment, the hand-up decision can be used in KKTC module 324 to refine location of the temporal cuts from rough to accurate.

In accordance with an exemplary embodiment, the quantities previously introduced to build both the KKTC module 324 and the CtS module 328 are further explained and once concatenated, the quantities can result in a finding of a gesture boundary 340.

In accordance with an exemplary embodiment, first, a local maxima of MMD along sliding windows providing rough location of temporal cuts is obtained. The amount of true positive and false negative cuts can be both decent, but the location of the cuts is approximate. Indeed, for example, the location of the cuts can tend to be too late at the beginning of a gesture and too early at the end. In parallel, local maxima of jerk estimate can be used to provide accurate location of cuts, but with false positives.

In accordance with an exemplary embodiment, each cut provided by a maximum of MMD can be refined to a cut provided by a local maximum of jerk, either forward or backward in time, using the value of the "hands up" decision function as disclosed herein. In accordance with an exemplary embodiment, this step assumes that a user is more likely to be in the middle of a gesture if its hands are up than if they are down.

In accordance with an exemplary embodiment, at the end of the process, the temporal cuts are both relevant and accurate, and few of them are false positives.

In accordance with an exemplary embodiment, the algorithm or steps performed by the KKTC module 324 are shown in Algorithm 1.

---
Algorithm 1 Kinematic Kernelized Temporal Cuts (KKTC):
isolate cuts delimiting segments potentially containing
gestures out of a time-series of human motion
---

Input :
- $X = (x_t) \in \mathbb{R}^{3N \times T}$ a sequence of N 3-dimensional skeleton joints of size T Output :
- $C \in ]1;T[^n$ a sequence of n cuts Parameters:
- $T_o \in \mathbb{N}$ the size of sliding windows
- $\delta T \in \mathbb{N}$ the step lenght of moving the sliding windows
- $\gamma$ the parameter of the gaussian kernel function $KS_{(T_o, \delta T, \gamma)}(X)$
  Compute $\{t_{MMD}\}$ the x-values of local maxima of $(MMD(t))_{t \in [1;T] \cap (\delta T) \mathbb{N}}$
  Compute $\{t_j\}$ the x-values of local maxima of $(j(t))_{t \in [1;T]}$
  $C \leftarrow$ empty list
  for $\hat{t} \in \{t_{MMD}\}$ do
    Find $\hat{t}_- \in \{t_j\}$ such that $\hat{t}_- < \hat{t}$ and $|\hat{t}_- - \hat{t}|$ is minimal
    Find $\hat{t}_+ \in \{t_j\}$ such that $\hat{t}_+ > \hat{t}$ and $|\hat{t}_+ - \hat{t}|$ is minimal
    if $D(\hat{t}_-) < D(\hat{t}_+)$ then
      Find $\hat{t}_{corrected} \in \{t_j\}$ such that $\hat{t}_{corrected} \leq \hat{t}_-$, $|\hat{t}_{corrected} - t_-|$ is
  maximal, and $(D(t))_{t \in [\hat{t}_{corrected}; \hat{t}_-]}$ is a sequence in strict ascending order
    if $D(\hat{t}_-) > D(\hat{t}_+)$ then
      Find $\hat{t}_{corrected} \in \{t_j\}$ such that $\hat{t}_{corrected} \geq \hat{t}_+$, $|\hat{t}_{corrected} - t_+|$ is
  maximal, and $(D(t))_{t \in [\hat{t}_+; \hat{t}_{corrected}]}$ is a sequence in strict ascending order
    if $D(\hat{t}_-) = D(\hat{t}_+)$ then
      $\hat{t}_{corrected} \leftarrow \hat{t}$
    C.append($\hat{t}_{corrected}$)
  return C Once the adjacent non-overlapping segments are identified by the KKTC module 324, the CtS module 328 is configured to identify segments containing gestures using acceleration. For example, in accordance with an exemplary embodiment, if the kernelized estimate of acceleration is positive at a cut position, then the segment between this cut and the next cut contains a gesture.

The algorithm or steps of the CtS module 326 are shown in Algorithm 2.

---
Algorithm 2 Cuts to Segments (CtS): transform a sequence
of cuts delimiting segments potentially containing gestures
to a sequence of segments containing gestures
---

Input :
- $X = (x_t) \in \mathbb{R}^{3N \times T}$ a sequence of N 3-dimensional skeleton joints of size T
- $C = (c_t) \in ]1;T[^n$ a sequence of n cuts Output :
- $S \subset [1;T]^m$ a sequence of m non-overlapping segments function CtS(C)
  $C \leftarrow [1, c_1, c_2, ..., c_{n-1}, c_n, T]$
  $S \leftarrow$ empty list
  for each couple $(c_i, c_{i+1})$ of successive cuts in C do
    if $a(c_i) > 0$ then
      S.append($[c_i, c_{i+1}]$)
  return S FIG. 5 is an illustration of a segmentation in accordance with an exemplary embodiment. As shown in FIG. 5, from top to bottom, synchronized RGB frames, skeleton frames, ground truth (manual) segmentation, and segmentation generated by KKTS are shown. Frames which belong to segments containing gestures have a crosshatched background. Frames which belong to segments not containing gestures have a white background. The presence of a gap between 2 represented frames means a cut occurred there. The figure represents two continuous gestures since there is no pause (i.e., no immobility phase) between them. In accordance with an exemplary embodiment, KKTS segments them correctly, and the generated segmentation does match the ground truth segmentation.

In accordance with an exemplary embodiment, a non-transitory computer readable medium containing a computer program storing computer readable code is disclosed for recognizing gestures, the program being executable by a computer to cause the computer to perform a process including: capturing at least one three-dimensional (3D) video stream of data on a subject; extracting a time-series of skeletal data from the at least one 3D video stream of data; isolating a plurality of points of abrupt content change and identifying each of the plurality of points of abrupt content change as a temporal cut, and wherein a plurality of temporal cuts define a set of non-overlapping adjacent segments partitioning the time-series of skeletal data; identifying among the plurality of temporal cuts, temporal cuts of the time-series of skeletal data having a positive acceleration; and classifying each of the one or more pair of consecutive cuts with the positive acceleration as a gesture boundary.

The computer usable medium, of course, may be a magnetic recording medium, a magneto-optic recording medium, or any other recording medium which will be developed in future, all of which can be considered applicable to the present invention in all the same way. Duplicates of such medium including primary and secondary duplicate products and others are considered equivalent to the above medium without doubt. Furthermore, even if an embodiment of the present invention is a combination of software and hardware, it does not deviate from the concept of the invention at all. The present invention may be implemented such that its software part has been written onto a recording medium in advance and will be read as required in operation.

It will be apparent to those skilled in the art that various modifications and variation can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for temporal segmentation of a video stream, comprising:
  capturing at least one three-dimensional (3D) video stream of data on a subject; extracting a time-series of skeletal data from the at least one 3D video stream of data;
  computing an estimated Maximum Mean Discrepancy (MMD) within the time-series of skeletal data, wherein the estimated MMD is calculated using two consecutive sliding windows of a same fixed sized;
  generating estimated temporal cuts among the time-series of skeletal data based on the estimated MMD, the estimated temporal cuts being non-overlapping adjacent segments partitioning the time-series of skeletal data;
  isolating a plurality of points of abrupt content change and identifying each of the plurality of points of abrupt content change as a temporal cut and wherein a plurality of temporal cuts define a set of non-overlapping adjacent segments partitioning the time-series of skeletal data;
  identifying among the plurality of temporal cuts, temporal cuts of the time-series of skeletal data having a positive acceleration;

classifying each of the one or more pair of consecutive cuts with the positive acceleration as a movement boundary.

2. The method of claim 1, comprising:
refining each of the estimated temporal cuts computed using the estimated MMD to generate a maximum rate of change of acceleration.

3. The method of claim 2, comprising:
generating the maximum rate of change acceleration using a value of a hands-up decision function, wherein the hands-up decision function is a sum of vertical position of a left-hand joint and a right-hand joint at a time (t);
classifying a positive hands-up decision function a gesture; and
classifying a negative hands-up decision function as a non-gesture.

4. The method of claim 1, comprising:
classifying a positive rate of acceleration within a temporal cut as a beginning of the movement; and
classifying a negative rate of acceleration within the temporal cut as an end of the movement.

5. The method of claim 1, comprising:
inputting the time-series of skeletal data from the at least one 3D video stream of data and the movement boundaries into a gesture recognition module; and
recognizing each of the movement boundaries as a type of gesture.

6. A system for recognizing movements, comprising:
a video camera for capturing at least one three-dimensional (3D) video stream of data on a subject;
a module for extracting a time-series of skeletal data from the at least one 3D video stream of data; and
a processor configured to:
compute an estimated Maximum Mean Discrepancy (MMD) within the time-series of skeletal data, wherein the estimated MMD is calculated using two consecutive sliding windows of a same fixed sized;
generate estimated temporal cuts among the time-series of skeletal data based on the estimated MMD, the estimated temporal cuts being non-overlapping adjacent segments partitioning the time-series of skeletal data;
isolate a plurality of points of abrupt content change and identifying each of the plurality of points of abrupt content change as a temporal cut, and wherein a plurality of temporal cuts define a set of non-overlapping adjacent segments partitioning the time-series of skeletal data;
identifying among the plurality of temporal cuts, temporal cuts of the time-series of skeletal data having a positive acceleration;
classifying each of the one or more pair of consecutive cuts with the positive acceleration as a movement boundary.

7. The system of claim 6, comprising:
a display for displaying results generated by the processor in which one or more movement boundaries from the time-series of skeletal data in a visual format.

8. The system of claim 6, wherein the processor is configured to:
refine each of the estimated temporal cuts computed using the estimated MMD to generate a maximum rate of change of acceleration, generate the maximum rate of change of acceleration using a value of a hands-up decision function, wherein the hands-up decision function is a sum of vertical position of a left-hand joint and a right-hand joint at a time (t);
classifying a positive hands-up decision function a gesture; and
classifying a negative hands-up decision function as a non-gesture.

9. The system of claim 8, wherein the processor is configured to:
classify a positive rate of acceleration within a temporal cut as a beginning of the gesture; and
classify a negative rate or acceleration within temporal cut as an end of the gesture.

10. The system of claim 6, comprising:
a gesture recognition module configured to receive the time-series of skeletal data from the at least one 3D video stream of data and the movement boundaries, and recognizing each of the movement boundaries as a type of gesture.

11. The system of claim 6, wherein the video camera is a RGB-D camera, and wherein the RGB-D camera produces a time-series of RGB frames and depth frames.

12. The system of claim 6, wherein the module for extracting a time-series of skeletal data from the at least one 3D video stream of data and the processor are in a stand-alone computer.

13. A non-transitory computer readable medium containing a computer program storing computer readable code for recognizing movements, the program being executable by a computer to cause the computer to perform a process comprising:
capturing at least one three-dimensional (3D) video stream data on a subject; extracting a time-series of skeletal data from the at least one 3D video stream of data:
computing an estimated Maximum Mean Discrepancy (MMD) within the time-series of skeletal data, wherein the estimated MMD is calculated using two consecutive sliding windows of a same fixed sized;
generating estimated temporal cuts among the time-series of skeletal data based on the estimated MMD, the estimated temporal cuts being non-overlapping adjacent segments partitioning the time-series of skeletal data;
isolating a plurality of points of abrupt content change and identifying each of the plurality of points of abrupt content change as a temporal cut, and wherein a plurality of temporal cuts define a set of non-overlapping adjacent segments partitioning the time-series of skeletal data;
identifying among the plurality of temporal cuts, temporal cuts of the time-series of skeletal data having a positive acceleration;
classifying each of the one or more pair of consecutive cuts with the positive acceleration as a movement boundary.

14. The computer readable storage medium of claim 13, comprising:
refining each of the estimated temporal cuts computed using the estimated MMD to generate a maximum rate of change of acceleration.

15. The computer readable storage medium of claim 13, comprising:
generating the maximum rate of change of acceleration using a value of a hands-up decision function, wherein the hands-up decision function is a sum of vertical position of a left-hand joint and a right-hand joint at a time (t);

classifying a positive hands-up decision function a gesture; and classifying a negative hands-up decision function as a non-gesture.

16. The computer readable storage medium of claim 13, comprising:

classifying a positive rate of acceleration within a temporal cut as a beginning of the movement; and classifying a negative rate of acceleration within the temporal cut as an end of the movement.

17. The computer readable storage medium of claim 13, comprising:

inputting the time-series of skeletal data from the at least one 3D video stream of data and the movement boundaries into a gesture recognition module; and recognizing each of the movement boundaries as a type of gesture.

18. The method of claim 1, wherein a segment between the movement boundary and a next temporal cut contains a movement.

19. The system of claim 6, wherein a segment between the movement boundary and a next temporal cut contains a movement.

20. The computer readable storage medium of claim 13, wherein a segment between the movement boundary and a next temporal cut contains a movement.

* * * * *